United States Patent Office 3,324,874
Patented June 13, 1967

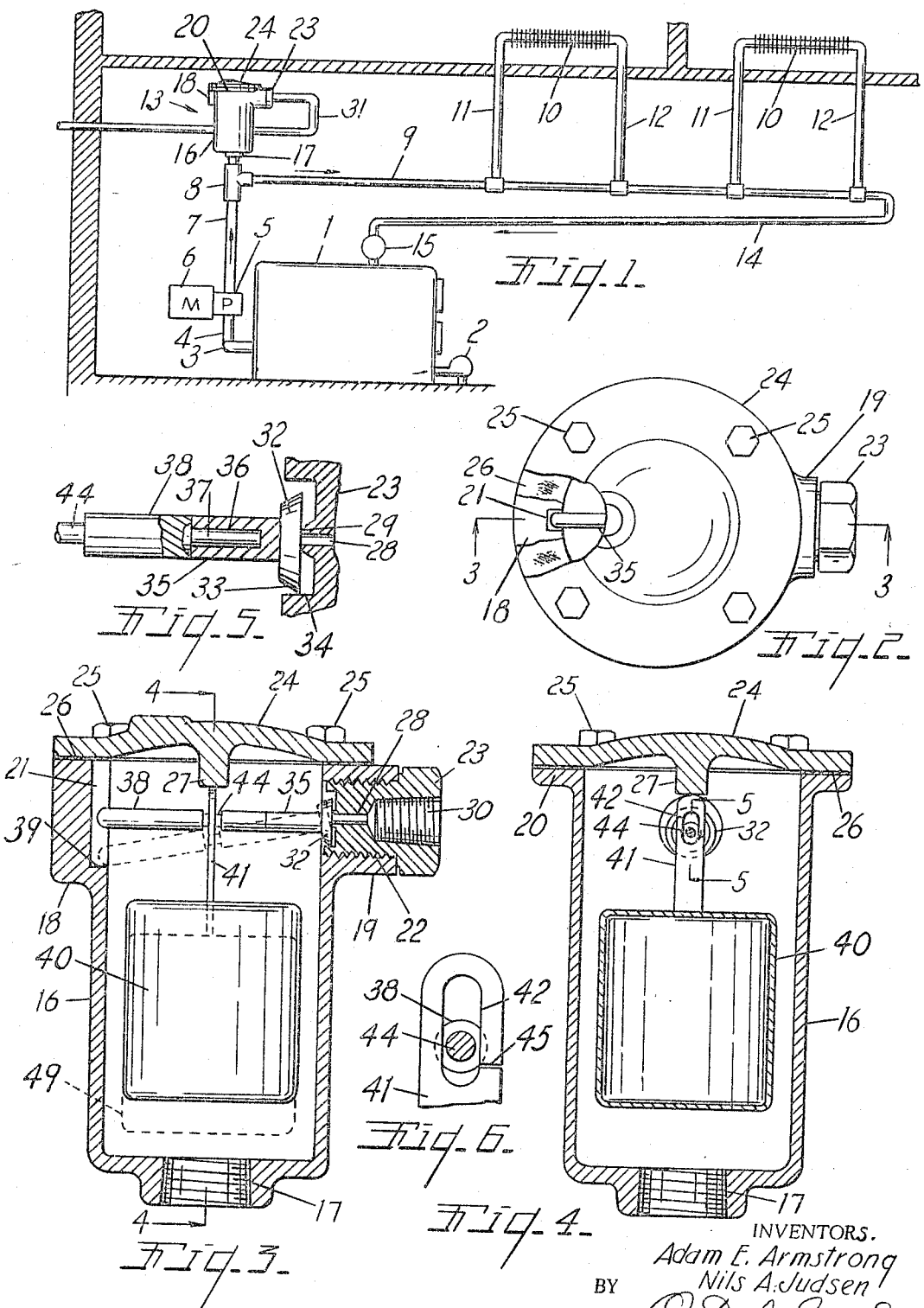

3,324,874
AIR RELIEF VALVE
Adam E. Armstrong and Nils A. Judsen, Three Rivers, Mich., assignors to Armstrong Machine Works, Three Rivers, Mich.
Filed June 26, 1964, Ser. No. 378,147
9 Claims. (Cl. 137—202)

This invention relates to an air relief valve for liquid circulating systems.

The main objects of this invention are:

First, to provide an air relief valve for trapping and discharging air from liquid circulating systems such, for example, as water heating systems which is highly efficient and prevents the discharge of the circulated liquid.

Second, to provide an air relief valve for use in pressure systems which automatically keeps the relief valve closed until a sufficient volume of entrapped air accumulates to cause the opening of the valve for release of the entrapped air.

Third, to provide an air relief valve which is opened by the displacement of a valve controlled float resulting from collection of air in the float chamber to such degree as to reduce the amount of liquid necessary to support the float in its liquid actuated position.

Fourth, to provide an air relief valve in which the valve is floatingly supported and guided by parts of the valve body and in which the float is in turn guided by coacting sliding engagement with the valve stem.

Fifth, to provide an air relief valve which is limited in its upward movement thereby preventing escape of liquid from the system while the float is in its liquid supported position.

Other objects and advantages will appear from the following description and claims. The drawings illustrate a highly practical form or embodiment of an air relief valve embodying the invention and one installation of the valve in a circulating system, the circulating system being mainly illustrated conventionally.

FIG. 1 is a fragmentary view partially in vertical section illustrating a hot water system having the air relief valve of the invention operatively associated therewith.

FIG. 2 is a fragmentary plan view of the relief valve assembly of the embodiment shown in FIG. 1.

FIG. 3 is a vertical sectional view on a line corresponding to line 3—3 of FIG. 2 showing the valve in closed position by full lines and in open position by dotted lines.

FIG. 4 is a vertical sectional view on a line corresponding to line 4—4 of FIG. 3.

FIG. 5 is an enlarged fragmentary view partially in section on a line corresponding to line 5—5 of FIG. 4.

FIG. 6 is an enlarged detail sectional view of the coupling of the float to the valve.

In FIG. 1 the air relief valve of the invention is shown installed in a hot water heating system but it should be understood that the valve is applicable to other liquid circulating systems of either high or low temperature liquids. The example of the system illustrated includes a hot water boiler 1 installed in the basement of a house and heated by a suitable burner 2. Hot water from the boiler is delivered or collected in the manifold 3 and is circulated through one or more heating circuits indicated by the pipe 4 by a pump 5 driven by the motor 6. The pump delivers through a riser pipe 7 to a T-coupling 8 from which the liquid is circulated through a delivery run 9 to one or more radiators 10 connected to the circulating run by conduits 11 and return conduits 12. The valve assembly indicated generally by the numeral 13 is mounted on the upper end of the main conduit 7 of the circulating circuit so that any air entrapped in the circulating liquid rises into the body of the valve as will be described.

After passing through the radiators 10 the liquid is returned through the return pipe 14 to a collecting drum 15 from which it is re-supplied to the boiler 1. The air relief valve unit 13 is thus subjected to the pressure in the circulating system 7 and is also in communication with the liquid in the system as will be described.

In the embodiment of our invention illustrated, the valve assembly consists of a generally cylindrical upright body member 16 having a threaded bore 17 in its lower wall for connection to the coupling 8 of the circulating system. At its upper end the body member 16 has oppositely facing radially thickened boss-like portions 18 and 19 and flange portions 20 between the boss portions 18 and 19. The boss 18 has an inwardly facing vertical groove 21 therein while the opposite boss 19 has an internally threaded bore 22 therein with which the valve seat and coupling member 23 is in threaded engagement. The body member top 24 is secured by means of tap screws 25.

In the embodiment illustrated a gasket 26 is positioned between the flange 20 and the rim of the cover. On its inner side the cover 24 is provided with a centrally disposed depending abutment or stop 27, the purpose of which will be described.

The valve seat and coupling member 23 has an exhaust port or passage 28 surrounded at its inner end by the annular valve seat 29. The port 28 opens at its outer end into a socket 30 to which the exhaust pipe 31 is connected. The exhaust pipe is desirably extended through a wall of a building to exhaust into the outer atmosphere as is conventionally illustrated. However, it will be understood that the exhaust discharge is varied according to installation conditions or requirements.

In the embodiment illustrated the valve 32 has a tapered peripheral portion 33 and is tiltably mounted on the support 34 in the inner end of the valve seat and coupling member 23. The valve has a stem portion 35 having a longitudinal bore 36 therein in which the coupling member 37 of the valve operating member 38 is fittingly engaged. This valve operating member 38 extends transversely across the body member with its outer end reciprocatingly engaged in the groove 21. The lower end 39 of the groove constitutes a stop limiting the downward swing of the valve operating member 38, as indicated by dotted lines in FIG. 3.

Within the body portion 16 is a hollow sealed float 40 having an upwardly projecting valve actuating stem 41. The stem 41 has a vertical slot 42 therein adapted to receive the reduced portion 44 of the member 38.

In the embodiment illustrated the float arm 41 is formed of bendable stock, its upper end being slit at 45 adjacent the lower end of the slot, see FIG. 6, so that the port above the slit may be swung outwardly to receive the reduced portion 44 of the valve operating member 38. with the parts thus arranged, the float 40 is in noncontacting relation with the walls of the float chamber. When the float is in fully raised position and supported by liquid in the valve body member 16, the upper end of the stem is in thrust engagement with the stop member.

It will be noted that the float 40 cannot descend further than is permitted by the inclined position of the rod in engagement with the bottom 39 of the slot or groove 21 but that in that position the valve 32 is tilted away from its closed or valve seat-engaging position as is illustrated by dotted lines in FIG. 3.

It will be understood that when the apparatus is not in use, the float will drop to the position indicated by dotted lines and open the valve.

It will be understood that the valve is closed and held closed when the float is in its raised position. When the float is in its fully raised position, the coupling member 41 engages the stop or abutment member 27 as is illustrated in FIGS. 3 and 4. After the heating or other system has been charged and liquid is being circulated therethrough, any entrapped air such as may leak into the system or may be purged from the radiators 10 rises through the inlet connection into the float chamber where it displaces liquid from the valve body until the buoyancy of the float 36 is decreased to the point where it drops to the dotted position indicated at 49 in FIG. 3. In this position the valve 32 is opened permitting liquid under pressure of the system to rise in the body 16 and the accumulated air is discharged through the exhaust passage 31 until the valve actuating bar is again raised to move or position the valve so that the pressure of the system will fully close the valve and hold it in closed position.

The valve 32 and the valve seat 29 are desirably hardened and polished to resist wear and provide effecive sealing.

We have illustrated and described our invention in a practical embodiment thereof. We have not attempted to illustrate or describe possible modifications as it is believed that this disclosure will enable those skilled in the art to embody our invention as may be desired for particular installations or use conditions.

Having thus described the invention, what is claimed as new and desired to secure by Letters Patent is:

1. An air relief valve assembly for liquid circulating systems comprising a cylindrical body member including a bottom wall having an inlet therein and having a removable closure member at its upper end, said closure member having a centrally disposed inwardly projecting abutment member, said body member having a threaded laterally opening coupling member socket adjacent its upper end and having a vertical inwardly opening groove in the wall thereof opposite said coupling member socket, a combined valve seat and coupling member threaded into said coupling member socket and having a centrally disposed outlet passage therein surrounded at its inner end by an annular inwardly projecting valve seat, said coupling member having an annular valve support surrounding said valve seat, a valve tiltably supported in said valve support to coact with said valve seat and having a stem with a bore therein opening at its inner end, a valve operating member having a stud engaged in said bore in said valve stem, the other end of said valve operating member being disposed in said inwardly facing groove in said body member side wall for vertical reciprocating movement therein, the lower end of said groove constituting a stop limiting the downward stroke of said valve operating member, said valve operating member having a reduced portion disposed in alignment with said abutment member on said top member, a float disposed within said body member and having an upwardly projecting arm fixedly connected thereto and having a vertical slot therein in which the reduced portion of said valve operating member is tiltably engaged, said arm on said float being aligned with said abutment member for engagement therewith thereby limiting such upward movement of said float as would open said valve.

2. An air relief valve assembly for liquid circulating systems comprising a cylindrical body member including a bottom wall having an inlet therein and having a removable closure member at its upper end, said closure member having a centrally disposed inwardly projecting abutment member, said body member having a threaded laterally opening coupling member socket adjacent its upper end and having a vertical inwardly opening groove in the wall thereof opposite said coupling member socket, a combined valve seat and coupling member threaded into said coupling member socket and having a centrally disposed outlet passage therein surrounded at its inner end by an annular inwardly projecting valve seat, a valve coacting with said valve seat and having a stem with a bore therein opening at its inner end, a valve operating member having a stud engaged in said bore in said valve stem, the other end of said valve operating member being disposed in said inwardly facing groove in said body member side wall for vertical reciprocating movement therein, the lower end of said groove constituting a stop limiting the downward stroke of said valve operating member said valve operating member having a reduced portion disposed in alignment with said abutment member on said top member, and a float disposed within said body member and having an upwardly projecting arm fixedly connected thereto and having a vertical slot therein in which the reduced portion of said valve operating member is tiltably engaged, said arm on said float being aligned with said abutment member for engagement therewith thereby limiting such upward movement of said float as would open said valve.

3. An air relief valve assembly for liquid circulating systems comprising a cylindrical body member including a bottom wall having an inlet therein and having a removable closure member at its upper end, said body member having a threaded laterally opening coupling member socket adjacent its upper end and having a vertical inwardly opening groove in the wall thereof opposite said coupling member socket, a combined valve seat and coupling member threaded into said coupling member socket and having a centrally disposed outlet passage therein surrounded at its inner end by an annular inwardly projecting valve seat, a valve coacting with said valve seat and having a stem with a bore therein opening at its inner end, a valve operating member having a stud engaged in said bore in said valve stem, the other end of said valve operating member being disposed in said inwardly facing groove in said body member side wall for vertical reciprocating movement therein, the lower end of said groove constituting a stop limiting the downward stroke of said valve operating member, said valve operating member having a reduced portion disposed in alignment with said abutment member on said top member, and a float disposed within said body member and having an upwardly projecting arm fixedly connected thereto and having a vertical slot therein in which the reduced portion of said valve operating member is tiltably engaged.

4. An air relief valve assembly for liquid circulating systems comprising a cylindrical body member having an inlet and having a removable closure member at its upper end, said closure member having a centrally disposed inwardly projecting abutment member, said body member having a threaded laterally opening coupling member socket adjacent is upper end and having a vertical inwardly facing groove in the wall thereof opposite said coupling member socket, a combined valve seat and coupling member threaded into said coupling member socket and having a centrally disposed outlet passage therein surrounded at is inner end by an annular inwardly projecting valve seat, said coupling member having an annular valve support surrounding said valve seat, a valve tiltably supported in said valve support in coacting relation with said valve seat, a valve operating member operatively connected at one end to said valve, the other end of said valve operating member being disposed in said inwardly facing groove in said body member side wall for vertical reciprocating movement therein, the lower end of said groove constituting a stop limiting the downward stroke of said valve operating member, said valve operating member having a reduced portion disposed in alignment with said abutment member on said top member, and a float disposed within said body member and having an upwardly projecting arm fixedly connected thereto and having a vertical slot therein in which the reduced portion of said valve operating member is tiltably engaged, said arm on said float being aligned with said abutment member for engagement therewith thereby limiting such upward movement of said float as would open said valve.

5. An air relief valve assembly for liquid circulating systems comprising a cylindrical body member having an inlet and having a removable closure member at its upper end, said closure member having a centrally disposed inwardly projecting abutment member, said body member having a threaded laterally opening coupling member socket adjacent its upper end and having a vertical inwardly facing groove in the wall thereof opposite said coupling member socket, a combined valve seat and coupling member threaded into said coupling member socket and having a centrally disposed outlet passage therein surrounded at its inner end by an annular inwardly projecting valve seat, a valve coacting with said valve seat, a valve operating member operatively connected at one and to said valve, the other end of said valve operating member being disposed in said inwardly facing groove in said body member side wall for vertical reciprocating movement therein, the lower end of said groove consituting a stop limiting the downward stroke of said valve operating member, said valve operating member having a reduced portion disposed in alignment with said abutment member on said top member, and a float disposed within said body member and having an upwardly projecting arm fixedly connected thereto and having a vertical slot therein in which the reduced portion of said valve operating member is tiltably engaged, said arm on said float being aligned with said abutment member for engagement therewith thereby limiting such upward movement of said float as would open said valve.

6. An air relief valve assembly for liquid circulating systems comprising a cylindrical body member having an inlet and having a removable closure member at its upper end, said body member having a threaded laterally opening coupling member socket adjacent its upper end and having a vertical inwardly facing groove in the wall thereof opposite said coupling member socket, a combined valve seat and coupling member threaded into said coupling member socket and having a centrally disposed outlet passage therein surrounded at its inner end by an annular inwardly projecting valve seat, a valve coacting with said valve seat, a valve operating member operatively connected at one end to said valve, the other end of said valve operatnig member disposed in said inwardly facing groove in said body member side wall for vertical reciprocating movement therein, the lower end of said groove consituting a stop limiting the downward stroke of said valve operating member, said valve operating member having a reduced portion disposed in alignment with said abutment member on said top member, and a float disposed within said body member and having an upwardly projecting arm fixedly connected thereto and having a vertical slot therein in which the reduced portion of said valve operating member is tiltably engaged.

7. An air relief valve assembly for liquid circulating systems comprising a chambered body member adapted to be connected to a circulating system and having a discharge outlet and a valve supporting seat below said outlet, a valve for said outlet supportedly and tiltably engaged with said valve supporting seat and having an inwardly projecting stem, a valve operating member operatively connected to said stem, said body member having a guide means for the other end of said valve operating member permitting vertical reciprocating movement thereof, there being a stop at the lower end of said guide means limiting the downward movement of said valve operating member, and a float disposed within said body member and having an arm fixedly connected thereto and projecting therefrom and having a slot therein through which said valve operating member projects, permitting limited relative movement of the valve operating member and the float.

8. An air relief valve assembly for liquid circulating systems comprising a chambered body member adapted to be connected to a circulating system and having a discharge outlet with a valve supporting seat below said outlet, a valve for said outlet supportedly and tiltably engaged with said valve supporting seat, a valve operating member to one end of which said valve is operatively connected, said body member having a guide means for the other end of said valve operating member permitting vertical reciprocating movement thereof, and a float disposed within said body member and having an arm fixedly connected thereto and projecting therefrom and having a slot therein through which said valve operating member projects, permitting limited relative movement of the valve operating member and the float.

9. An air relief valve assembly for a pressurized, liquid circulating system comprising:

a chambered body member adapted to be connected to a liquid circulating system and having an outlet in its side wall adjacent its upper end and provided with an inwardly facing valve seat, said body member also having a valve supporting shelf below said outlet;

a valve supportedly engaged with said shelf of said body member for tilting movement into and out of closing engagement with said valve seat and having stem means disposed within and extending transversely of said body member, said body member including guide means for said stem means spaced from said valve and permitting vertical reciprocating movement of said stem means;

a float disposed within said body member and movable vertically therein; and lost-motion means connecting said float to said stem means so that said float acts to open said valve when said float moves into a low position and said float acts to close said valve when said float moves into a high position, said valve being held closed by the pressure in said body member until opened by said float.

References Cited

UNITED STATES PATENTS

| | | | |
|---|---|---|---|
| 1,223,190 | 4/1917 | Manning | 137—202 |
| 2,848,879 | 8/1958 | Hesson | 137—202 X |

FOREIGN PATENTS

| | | |
|---|---|---|
| 560,771 | 4/1957 | Italy. |

ALAN COHAN, *Primary Examiner.*